US012000540B2

(12) United States Patent
Park

(10) Patent No.: US 12,000,540 B2
(45) Date of Patent: Jun. 4, 2024

(54) VALVE RECOVERY CONTROL APPARATUS FOR HYDROGEN TANK

(71) Applicants: Hyundai Motor Company, Seoul (KR); Kia Corporation, Seoul (KR)

(72) Inventor: Seok Hyeon Park, Hampyeung-eup (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/679,558

(22) Filed: Feb. 24, 2022

(65) Prior Publication Data

US 2022/0307653 A1 Sep. 29, 2022

(30) Foreign Application Priority Data

Mar. 25, 2021 (KR) ........................ 10-2021-0038561

(51) Int. Cl.
*F17C 13/04* (2006.01)
*F17C 7/00* (2006.01)

(52) U.S. Cl.
CPC ................ *F17C 13/04* (2013.01); *F17C 7/00* (2013.01); *F17C 2205/0332* (2013.01); *F17C 2221/012* (2013.01); *F17C 2250/043* (2013.01); *F17C 2250/0636* (2013.01); *F17C 2260/021* (2013.01); *F17C 2270/0184* (2013.01)

(58) Field of Classification Search
CPC ............. F17C 13/04; F17C 2270/0184; Y10T 137/7727; G05D 16/103; H01M 8/04104; F16K 37/0091; F16K 2200/401
See application file for complete search history.

(56) References Cited

U.S. PATENT DOCUMENTS 2,543,920 A * 3/1951 McCabe, Jr. ........... F17C 13/04 222/547
6,380,637 B1 * 4/2002 Hsu ......................... B60L 58/34 290/1 R
7,359,790 B2 * 4/2008 Gottwick .......... H01M 8/04992 429/444

* cited by examiner

*Primary Examiner* — Reinaldo Sanchez-Medina
*Assistant Examiner* — Nicole Gardner
(74) *Attorney, Agent, or Firm* — MORGAN, LEWIS & BOCKIUS LLP

(57) ABSTRACT

A valve recovery control apparatus for a hydrogen tank, may recover an excess flow valve to an original state upon operation of the excess flow valve mounted on the hydrogen tank, securing stability of hydrogen supply to the fuel cell.

12 Claims, 5 Drawing Sheets

VALVE RECOVERY CONTROL APPARATUS FOR HYDROGEN TANK

CROSS-REFERENCE TO RELATED APPLICATION

The present application claims priority to Korean Patent Application No. 10-2021-0038561 filed on Mar. 25, 2021, the entire contents of which is incorporated herein for all purposes by this reference.

BACKGROUND OF THE INVENTION

Field of the Invention

The present invention relates to a valve recovery control apparatus for a hydrogen tank, and specifically, to a valve recovery control apparatus for a hydrogen tank for securing stability of hydrogen supply to a fuel cell upon traveling.

Description of Related Art

A fuel cell vehicle is mounted with a hydrogen tank for storing hydrogen used as a fuel of a fuel cell. Furthermore, the hydrogen tank is provided with an excess flow valve (EFV) for preventing an excess flow of hydrogen discharged by the hydrogen tank.

If an internal pressure of the hydrogen tank is higher than a pressure of a hydrogen supply line connected to a rear end portion of an excess flow valve by a certain value or more, the excess flow of hydrogen occurs in the hydrogen supply line, and the excess flow of hydrogen may cause breakage of the hydrogen supply line or the like. Therefore, the hydrogen tank is provided with the excess flow valve, preventing the excess flow of hydrogen from occurring in the hydrogen supply line.

The excess flow valve mounted on the hydrogen tank is an always-on open valve operated mechanically.

The excess flow valve normally maintains an opened state, and may be selectively operated if there occurs a different between the pressure of the hydrogen tank and the pressure of the hydrogen supply line, becoming a closed state. Furthermore, the excess flow valve is provided with a pin hole capable of sending a very small flow of hydrogen to the hydrogen supply line in the closed state.

The excess flow valve does not generate an electrical feedback signal because it operates mechanically. Therefore, if there occurs a difference between a pressure at an inlet of the excess flow valve and a pressure at an outlet of the excess flow valve, the operability of the excess flow valve is very high but a driver and a controller in the vehicle may not confirm whether the excess flow valve operates.

Therefore, since the controller in the vehicle may not detect the operation of the excess flow valve even if the excess flow valve operates and is closed, it is not possible to take separate measures for the operation of the excess flow valve. In such a circumstance, when an amount of hydrogen consumed in the fuel cell connected to the hydrogen supply line is greater than an amount of hydrogen supplied through the pin hole of the excess flow valve, it is not possible to normally supply hydrogen to the fuel cell such that the vehicle is turned off due to lack of the hydrogen supply to the fuel cell.

Furthermore, since a hydrogen supply line for a hydrogen tank applied to a commercial vehicle has a long length and a complicated pipe and is provided with a locking lever for maintenance, leakage, and special equipment work or the like, the pressure at the outlet of the excess flow valve tends to be lower than the pressure at the inlet of the excess flow valve. Therefore, an excess flow valve for a hydrogen tank mounted on the commercial vehicle has a relatively high operability such that the stability of hydrogen supply to the fuel cell is lowered.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a valve recovery control apparatus configured for a hydrogen tank, which recovers an excess flow valve to an original state upon operation of the excess flow valve mounted on a hydrogen tank, securing stability of hydrogen supply to a fuel cell.

Therefore, various aspects of the present invention provide a valve recovery control apparatus configured for a hydrogen tank including an excess flow valve mounted on an outlet of a hydrogen tank; a hydrogen supply line connected to the excess flow valve, and configured to supply hydrogen stored in the hydrogen tank to a fuel cell connected to the hydrogen supply line; and a control unit configured to determine whether the excess flow valve is closed based on an amount of hydrogen consumed in the fuel cell and a pressure reduction rate in the hydrogen supply line when a pressure of the hydrogen tank is greater than a pressure of the hydrogen supply line, and to suspend an operation of the fuel cell until the excess flow valve recovers to an opened state when the controller concludes that the excess flow valve is in a closed state.

The control unit is configured for determining that the excess flow valve is in the closed state, when the amount of hydrogen consumed per unit time in the fuel cell is a predetermined minimum amount of consumption or greater than the predetermined minimum amount and the pressure reduction rate of the hydrogen supply line is greater than a predetermined first pressure reduction rate.

Furthermore, the control unit is configured for determining that the excess flow valve is in the opened state, when the amount of hydrogen consumed per unit time in the fuel cell is a predetermined minimum amount of consumption or greater than the predetermined minimum amount and the pressure reduction rate in the hydrogen supply line is a predetermined first pressure reduction rate or less than the predetermined first pressure reduction rate.

Here, the minimum amount of consumption is set as a value of a minimum amount of hydrogen consumed in the fuel cell causing a reduction in the pressure of the hydrogen supply line when the excess flow valve is in the closed state. Furthermore, the first pressure reduction rate is set as a value of a maximum pressure reduction rate of the hydrogen supply line generatable when the excess flow valve is in the opened state.

Furthermore, the control unit is configured for operating a vehicle in an electric vehicle mode until the excess flow valve recovers to the opened state when the excess flow valve is in the closed state.

Furthermore, the control unit is configured for restarting the fuel cell when the excess flow valve recovers to the opened state.

Furthermore, the excess flow valve includes a housing provided with a valve inlet and a valve outlet; a poppet slidably assembled in the housing; a spring mounted in the housing to elastically support the poppet toward the valve inlet; and a pin hole configured to supply the hydrogen of the hydrogen tank to the hydrogen supply line when the poppet closes the valve outlet while compressing the spring.

According to the above configuration, various aspects of the present invention provide the following main effects.

First, it is possible to rapidly recover the excess flow valve to the original state when hydrogen may not be normally supplied to the fuel cell due to the operation of the excess flow valve, securing stability of hydrogen supply to the fuel cell.

Second, if the excess flow valve is operated to be switched to the closed state, it is possible to prevent the vehicle from being turned off due to lack of the hydrogen supply to the fuel cell by rapidly returning the excess flow valve to the original opened state.

It is understood that the term "automotive" or "vehicular" or other similar term as used herein is inclusive of motor automotives in such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels determined from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
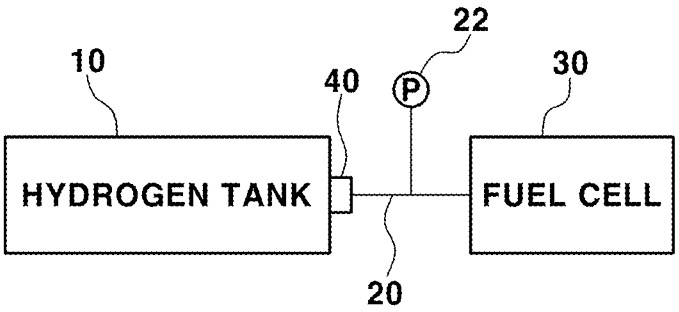
FIG. 1 is a diagram illustrating a hydrogen tank system to which a valve recovery control apparatus for a hydrogen tank according to various exemplary embodiments of the present invention is applied.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, of the present invention an exemplary embodiment of the present invention will be described with reference to the accompanying drawings. The contents expressed by the accompanying drawings are drawings illustrated for easily explaining the exemplary embodiment of the present invention and may be different from the form being actually implemented.

Throughout the specification, when any portion "includes" any component, it means that other components may be further included, rather than excluded, unless specially described otherwise.

Furthermore, when a component is referred to as being "connected" or "coupled" to another component, it should be understood that it may be directly connected or coupled to another component, but other components may exist therebetween. On the other hand, when a component is referred to as being "directly connected to" or "directly in contact with" another component, it should be understood that there is no other components therebetween. Other expressions for describing the relationship between components, that is, expressions such as "between" and "directly between" or "adjacent to" and "directly adjacent to" should be also interpreted in the same manner.

Figure 2:
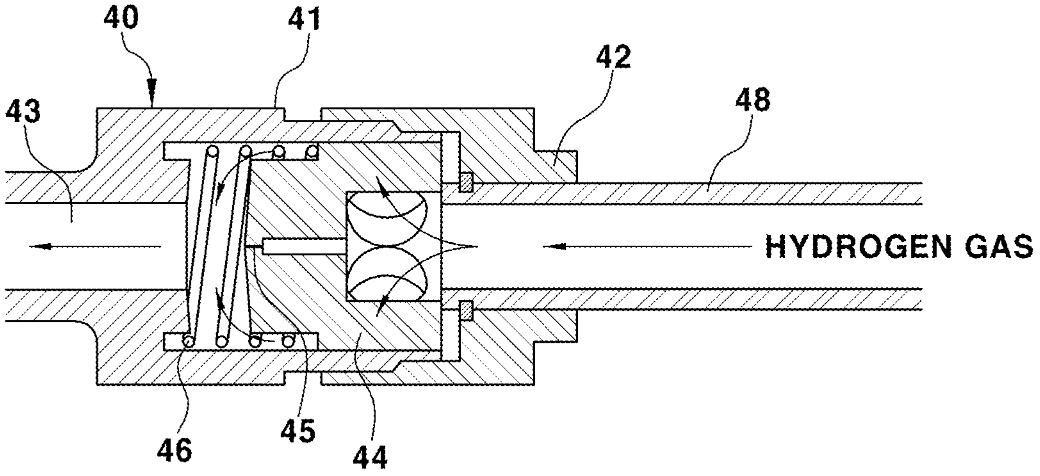
FIG. 2 is a diagram illustrating an opened state of an excess flow valve provided in the hydrogen tank system.
Figure 3:
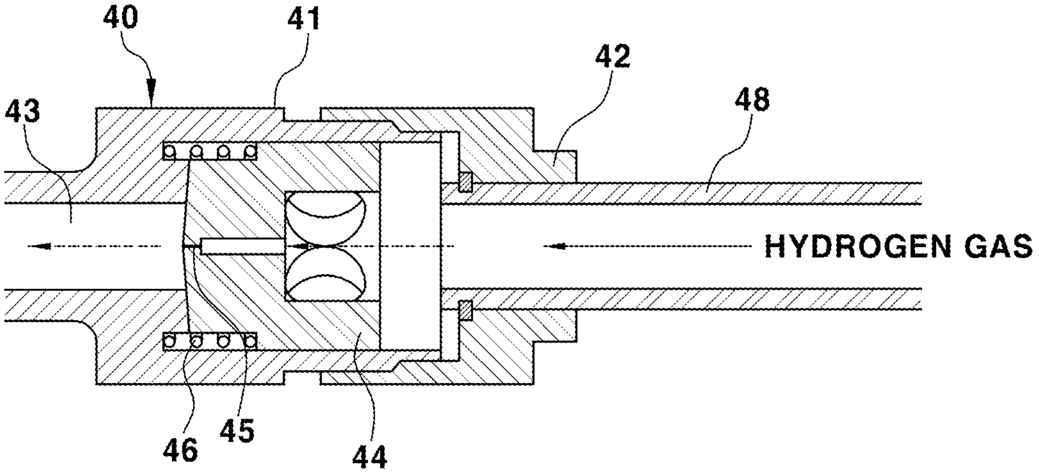
FIG. 3 is a diagram illustrating a closed state of the excess flow valve provided in the hydrogen tank system.

FIG. 1 is a diagram illustrating a hydrogen tank system to which a valve recovery control apparatus for a hydrogen tank according to various exemplary embodiments of the present invention is applied, FIG. 2 is a diagram illustrating an opened state of an excess flow valve provided in the hydrogen tank system, and FIG. 3 is a diagram illustrating a closed state of the excess flow valve.

As illustrated in FIG. 1, a hydrogen tank 10 for a fuel cell vehicle is gas-movably connected to a fuel cell 30 through a hydrogen supply line 20. An outlet of the hydrogen tank 10 is mounted with an excess flow valve (EFV) 40 for preventing an excess flow of hydrogen supplied from the hydrogen tank 10 to the fuel cell 30.

Although FIG. 1 illustrates only the excess flow valve 40 mounted on the outlet of the hydrogen tank 10 and a line pressure sensor 22 mounted on the hydrogen supply line 20, the hydrogen tank system illustrated in FIG. 1 may include a configuration of a general hydrogen tank system, and the outlet of the hydrogen tank 10 may be mounted with other components other than the excess flow valve 40. For example, the outlet of the hydrogen tank 10 may be mounted with a valve assembly including the excess flow valve 40 and a solenoid valve.

The fuel cell 30 may receive the hydrogen stored in the hydrogen tank 10 through the hydrogen supply line 20 connected to a rear end portion of the excess flow valve 40. That is, the hydrogen supply line 20 may supply the hydrogen stored in the hydrogen tank 10 to the fuel cell 30.

The excess flow valve 40 has a front end portion connected to the hydrogen tank 10 and a rear end portion connected to the hydrogen supply line 20.

As illustrated in FIG. 2 and FIG. 3, the excess flow valve 40 includes a housing 41, a poppet 44 slidably mounted in the housing 41, and a spring 46 for determining an operation pressure of the poppet 44. The excess flow valve 40 is an always-on open-type mechanical valve.

The housing 41 is provided with a valve inlet 42 at a front end portion thereof and the housing 41 is provided with a valve outlet 43 at a rear end portion thereof. The valve inlet 42 is gas-movably connected to a gas discharge line 48 disposed inside the hydrogen tank 10, and the valve outlet 43 is gas-movably connected to the hydrogen supply line (see 20 in FIG. 1) disposed outside the hydrogen tank 10.

The poppet 44 is elastically supported toward the valve inlet 42 by the spring 46 mounted inside the housing 41. The poppet 44 is operated by a difference between the pressure at the valve inlet 42 side and the pressure at the valve outlet 43 side. That is, the poppet 44 is operated by a difference between an internal pressure of the hydrogen tank 10 and an internal pressure of the hydrogen supply line 20 (hereinafter, referred to as 'first pressure difference'). The poppet 44 moves toward the valve outlet 43 while compressing the spring 46 when operated by the first pressure difference.

The thus configured excess flow valve 40 normally maintains an opened state, and is selectively operated if the first pressure difference occurs, becoming a closed state. Furthermore, the excess flow valve 40 is provided with a pin hole 45 capable of sending a very small amount of hydrogen to the hydrogen supply line 20 in the closed state. The pin hole 45 is provided at a rear end portion of the poppet 44.

If the internal pressure of the hydrogen tank 10 and the internal pressure of the hydrogen supply line 20 are the same, the poppet 44 maintains the valve outlet 43 in the opened state. The poppet 44 opens the valve outlet 43 when positioned at a first position neighboring to the valve inlet 42 in the housing 41. The poppet 44 is positioned at the first position at which the valve outlet 42 is normally opened. If the valve outlet 43 is opened, the hydrogen of the hydrogen tank 10 flowing into the housing 41 through the valve inlet 42 flows into the hydrogen supply line 20 through the valve outlet 43.

Furthermore, if the internal pressure of the hydrogen tank 10 is higher than the internal pressure of the hydrogen supply line 20 by a predetermined pressure or more, the poppet 44 moves to a second position at which the valve outlet 43 is closed to close the valve outlet 43. The poppet 44 closes the valve outlet 43 adjacent to the valve outlet 43 when being positioned at the second position. If the valve outlet 43 is closed by the poppet 44, the excess hydrogen flow to the hydrogen supply line 20 may be blocked from occurring.

Furthermore, if the valve outlet 43 is closed by the poppet 44, the internal pressure of the hydrogen supply line 20 may be recovered to the same level as that of the internal pressure of the hydrogen tank 10 by the hydrogen flow occurring through the pin hole 45 of the poppet 44. When the internal pressure of the hydrogen supply line 20 becomes the same as the internal pressure of the hydrogen tank 10, the poppet 44 returns to the first position.

Since the excess flow valve 40 mechanically operates, it does not generate an electrical feedback signal. Therefore, if there occurs a difference between a pressure at a front end portion of the excess flow valve 40 and a pressure at a rear end portion of the excess flow valve, the operability of the excess flow valve 40 is high but it is not possible for a controller in the vehicle to confirm an operation state of the excess flow valve 40.

Therefore, even if the poppet 44 of the excess flow valve 40 moves to the second position at which the valve outlet 43 is closed, the control unit in the vehicle may not detect the operation state of the excess flow valve 40, not taking separate measures for the operation of the excess flow valve 40. In such a situation, when the amount of hydrogen consumed of the fuel cell 30 connected to the hydrogen supply line 20 is greater than an amount of hydrogen supplied through the pin hole 45 of the excess flow valve 40, the hydrogen may not be normally supplied to the fuel cell 30 such that the vehicle is turned off during traveling due to lack of the hydrogen supply to the fuel cell 30.

Therefore, various aspects of the present invention provide a valve recovery control apparatus for a hydrogen tank, which recovers the excess flow valve 40 to the original state (i.e., opened state) when the closed state of the excess flow valve 40 is detected as a result of detecting the operation state of the excess flow valve 40 mounted on the hydrogen tank 10, securing stability of hydrogen supply to the fuel cell 30 during traveling.

The valve recovery control apparatus recovers the excess flow valve 40 to the original state when the operation of the excess flow valve 40 is detected, if there occurs a difference between the pressure at the front end portion (i.e., pressure at the valve inlet side) of the excess flow valve 40 mounted on the outlet of the hydrogen tank 10 and the pressure at the rear end portion (i.e., pressure at the valve outlet side) of the excess flow valve 40.

Furthermore, the valve recovery control apparatus may suspend the operation of the fuel cell 30 until the excess flow valve 40 returns to a state where hydrogen may be normally supplied to the fuel cell 30, preventing the vehicle from being turned off during traveling and facilitating the normal operation of the vehicle.

Figure 4:
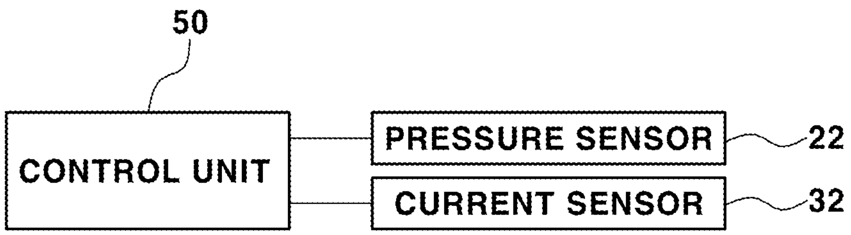
FIG. 4 is a diagram illustrating the valve recovery control apparatus for the hydrogen tank according to various exemplary embodiments of the present invention.
Figure 5:
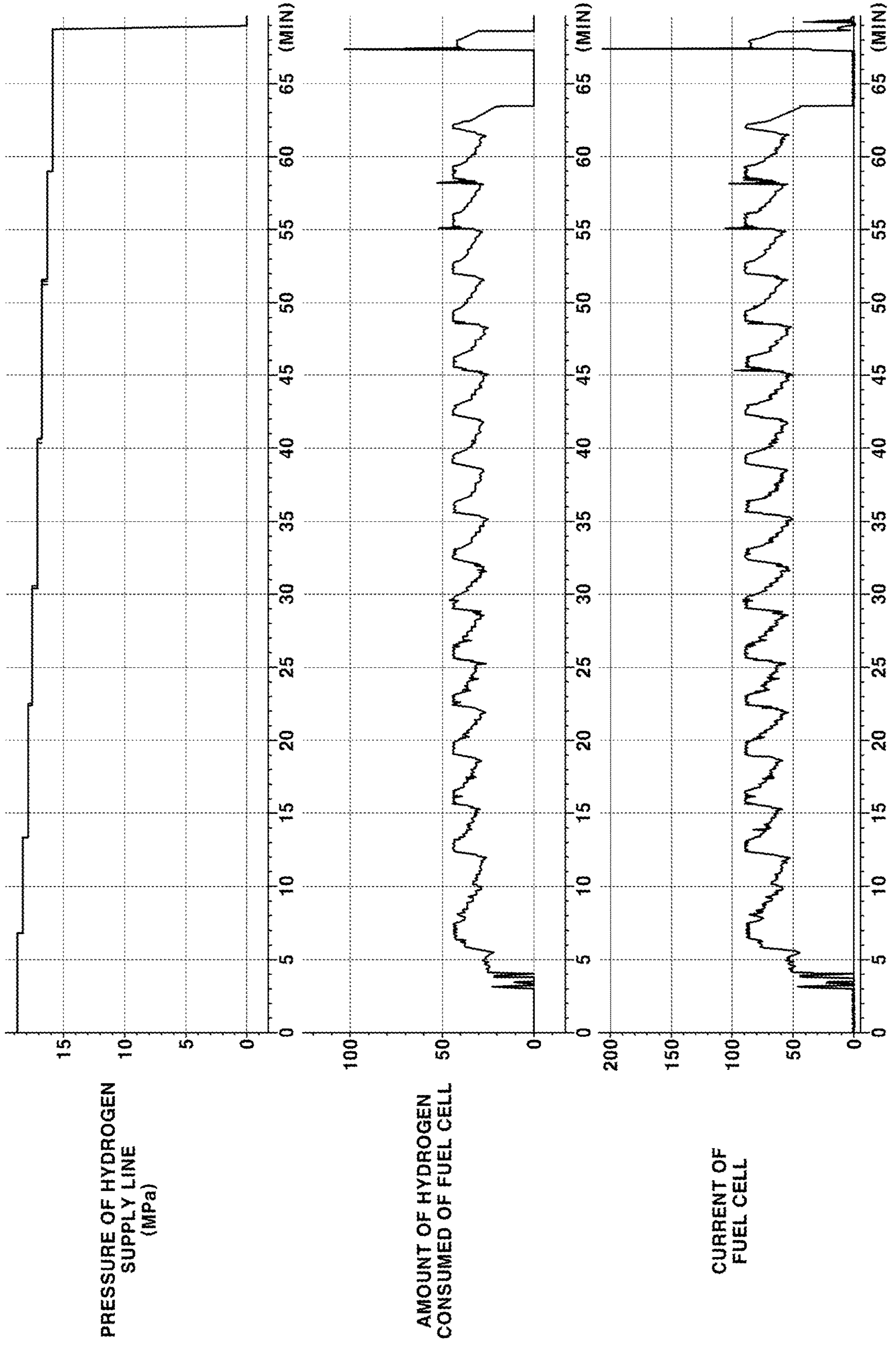
FIG. 5 is a graph illustrating a pressure of a hydrogen supply line, a current of a fuel cell, and an amount of hydrogen consumed if the excess flow valve is in the opened state.
Figure 6:
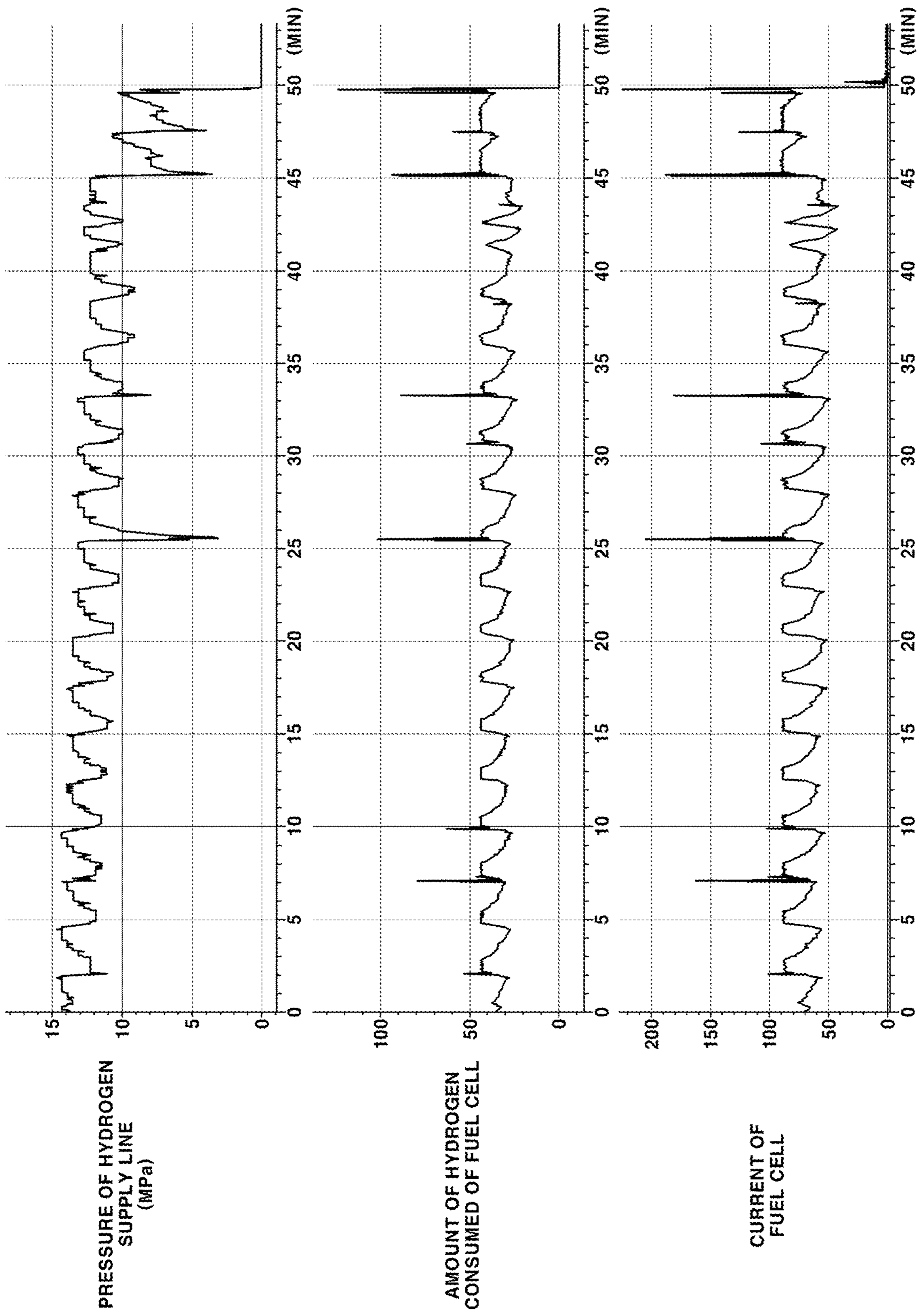
FIG. 6 is a graph illustrating the pressure of the hydrogen supply line, the current of the fuel cell, and the amount of hydrogen consumed if the excess flow valve is in the closed state.

FIG. 4 is a diagram illustrating a configuration of the valve recovery control apparatus for the hydrogen tank according to various exemplary embodiments of the present invention, FIG. 5 is a graph illustrating a pressure of the hydrogen supply line, a current of the fuel cell, and an amount of hydrogen consumed if the excess flow valve is in the opened state, and FIG. 6 is a graph illustrating the pressure of the hydrogen supply line, the current of the fuel cell, and the amount of hydrogen consumed if the excess flow valve is in the closed state. At the instant time, the amount of hydrogen consumed of the fuel cell is a value determined based on the current of the fuel cell.

As illustrated in FIG. 4, the valve recovery control apparatus configured for the hydrogen tank according to various exemplary embodiments of the present invention may include a control unit 50 for determining whether the excess flow valve 40 is operated.

The control unit 50 may determine whether the excess flow valve 40 is operated based on information received from a current sensor 32 configured to detect the current of the fuel cell 30 and the line pressure sensor 22 configured to detect the pressure of the hydrogen supply line 20.

The control unit 50 may determine whether the excess flow valve 40 is operated based on a pressure reduction rate of the hydrogen supply line 20 and the amount of hydrogen consumed of the fuel cell 30. The amount of hydrogen consumed of the fuel cell 30 may be determined based on the current of the fuel cell 30. Since the determination of the amount of hydrogen consumed of the fuel cell 30 based on the current of the fuel cell 30 is a known technology, a detailed description thereof will be omitted.

Referring to FIG. 5, if the excess flow valve 40 is in the opened state, the pressure of the hydrogen supply line 20 is reduced as the hydrogen of the fuel cell 30 continues to be consumed, but the reduction in the pressure of the hydrogen supply line 20 due to the increase in the amount of hydrogen consumed of the fuel cell 30 is very small.

Referring to FIG. 6, if the excess flow valve 40 is in the closed state, the pressure of the hydrogen supply line 20 is reduced as the amount of hydrogen consumed of the fuel cell 30 increases, and furthermore, the reduction in the pressure of the hydrogen supply line 20 due to the increase in the amount of hydrogen consumed of the fuel cell 30 excessively occurs due to lack of hydrogen flow supplied to the hydrogen supply line 20.

That is, if the excess flow valve 40 is in the closed state, the reduction in the pressure of the hydrogen supply line 20 rapidly occurs when the amount of hydrogen consumed of the fuel cell 30 increases.

Therefore, if the pressure of the hydrogen supply line 20 is inversely proportional to the amount of hydrogen consumed of the fuel cell 30, the control unit 50 may determine whether the excess flow valve 40 is operated based on the pressure reduction rate of the hydrogen supply line 20 and the amount of hydrogen consumed per unit time of the fuel cell 30 in real time. At the instant time, the pressure reduction rate of the hydrogen supply line 20 may be a pressure reduction rate per second determined in real time, and the amount of hydrogen consumed of the fuel cell 30 may be an amount of hydrogen consumed per second determined in real time.

When the amount of hydrogen consumed of the fuel cell 30 is a predetermined minimum amount of consumption (X) or more and the pressure reduction rate of the hydrogen supply line 20 is greater than a predetermined first pressure reduction rate (Y), the control unit 50 may determine that the excess flow valve 40 is in the closed state.

If the excess flow valve 40 is in the closed state, a small amount of hydrogen flow is supplied to the hydrogen supply line 20 through the pin hole 45 of the poppet 44 such that the reduction in the pressure of the hydrogen supply line 20 may not occur if the amount of hydrogen consumed of the fuel cell 30 is small.

Therefore, it is necessary to set the minimum amount of consumption (X) as a minimum value of the amount of hydrogen consumed of the fuel cell 30, and to determine whether the excess flow valve 40 is erroneously operated based on the pressure reduction rate of the hydrogen supply line 20 when the amount of hydrogen consumed of the fuel cell 30 is the minimum amount of consumption (X) or more.

The minimum amount of consumption (X) may be set as a value of the minimum amount of hydrogen consumed of the fuel cell 30 causing the reduction in the pressure of the hydrogen supply line 20 when the excess flow valve 40 is in the closed state. If the excess flow valve 40 is in the closed state, the hydrogen supply through the pin hole 45 of the poppet 44 occurs such that the minimum amount of consumption (X) may be set as a value greater than the hydrogen flow passing through the pin hole 45.

Furthermore, the first pressure reduction rate (Y) may be set as a value of the maximum pressure reduction rate of the hydrogen supply line 20, which may occur as the fuel cell 30 consumes hydrogen at a maximum value when the excess flow valve 40 is in the opened state.

If the excess flow valve 40 is in the opened state, that is, in the case of a condition where hydrogen is normally supplied to the hydrogen supply line 20, the pressure reduction rate of the hydrogen supply line 20 becomes the first pressure reduction rate (Y) or less.

Therefore, the control unit 50 may determine that the excess flow valve 40 is in the closed state when the pressure reduction rate of the hydrogen supply line 20 is greater than the first pressure reduction rate (Y).

That is, the control unit 50 may determine that the excess flow valve 40 is in the closed state when the amount of hydrogen consumed per unit time of the fuel cell 30 is the minimum amount of consumption (X) or more and the pressure reduction rate of the hydrogen supply line 20 is greater than the first pressure reduction rate (Y).

Furthermore, the control unit 50 may determine that the excess flow valve 40 is in the opened state when the amount of hydrogen consumed per unit time of the fuel cell 30 is the minimum amount of consumption (X) or more and the pressure reduction rate of the hydrogen supply line 20 is the first pressure reduction rate (Y) or less.

Furthermore, if the amount of hydrogen consumed per unit time of the fuel cell 30 is less than the minimum amount of consumption (X), the fuel cell 30 may be normally operated regardless of whether the excess flow valve 40 is opened or closed. If the excess flow valve 40 is in the closed state, hydrogen is supplied to the hydrogen supply line 20 through the pin hole 45 of the excess flow valve 40 such that the fuel cell 30 may be operated at a low output.

Therefore, the control unit 50 may determine that the fuel cell 30 may be normally operated and the vehicle may be normally traveled when the amount of hydrogen consumed per unit time of the fuel cell 30 is less than the minimum amount of consumption (X).

Figure 7:
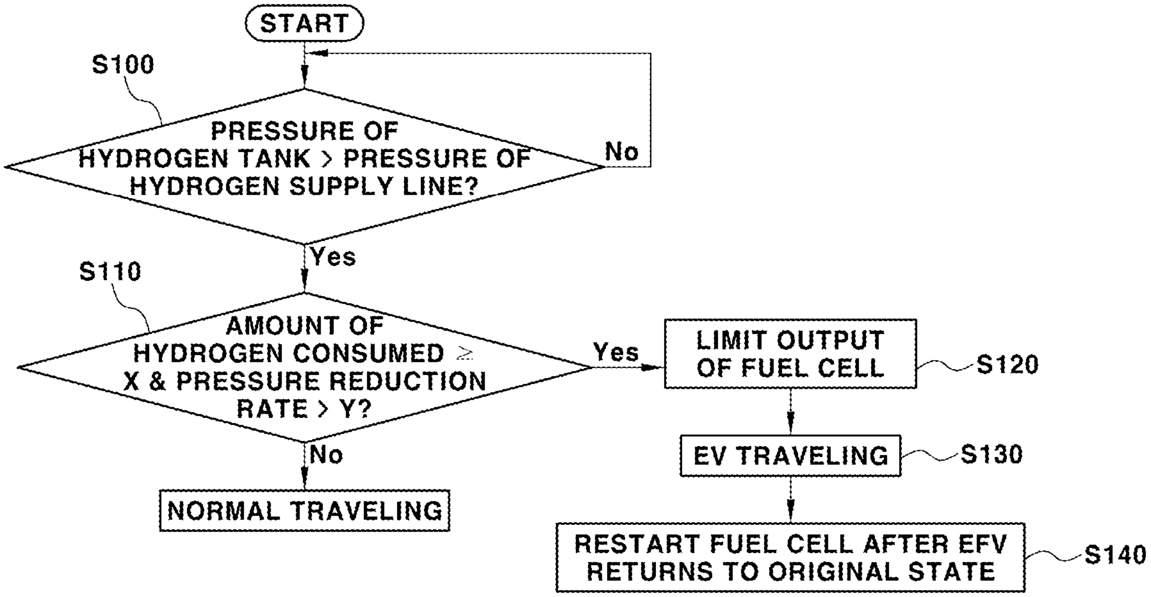
FIG. 7 is a diagram illustrating a control process using the valve recovery control apparatus for the hydrogen tank according to various exemplary embodiments of the present invention.

FIG. 7 is a diagram illustrating a control process using the valve recovery control apparatus for the hydrogen tank according to various exemplary embodiments of the present invention.

If the internal pressure of the hydrogen tank 10 is greater than the internal pressure of the hydrogen supply line 20, the poppet 44 is operated by a difference between the pressures of the hydrogen tank 10 and the hydrogen supply line 20 when the vehicle is started such that the excess flow valve 40 may be switched to the closed state. If the excess flow valve 40 is closed, the pressure of the hydrogen supply line 20 is changed according to a change in the amount of hydrogen consumed of the fuel cell 30.

As illustrated in FIG. 7, if it is determined that the internal pressure of the hydrogen tank 10 is greater than the internal pressure of the hydrogen supply line 20 by comparing the internal pressure of the hydrogen tank 10 with the internal pressure of the hydrogen supply line 20 (S100), that is, if the operability of the excess flow valve 40 exists, the control unit 50 compares the amount of hydrogen consumed of the fuel cell 30 with the minimum amount of consumption (X) and compares the pressure reduction rate of the hydrogen supply line 20 with the first pressure reduction rate (Y) (S110).

The control unit 50 may confirm the internal pressure of the hydrogen tank 10 based on information received from a tank pressure sensor mounted on the hydrogen tank 10. The tank pressure sensor is mounted on a front end portion of a solenoid valve to detect a pressure value configured for representing the pressure of the hydrogen tank. The solenoid valve is a valve coupled to and mounted on an outlet of the hydrogen tank 10 to open or close the outlet.

When the amount of hydrogen consumed of the fuel cell 30 is the predetermined minimum amount of consumption (X) or more and the pressure reduction rate of the hydrogen supply line 20 is greater than the predetermined first pressure reduction rate (Y) based on the comparison result in S110, the control unit 50 determines that the excess flow valve 40 is in the closed state and executes an S120 step.

As the comparison result in S110, when the amount of hydrogen consumed of the fuel cell 30 is less than the predetermined minimum amount of consumption (X) or the pressure reduction rate of the hydrogen supply line 20 is the predetermined first pressure reduction rate (Y) or less, the control unit 50 may determine that the excess flow valve 40 is in the closed state but the fuel cell 30 may be operated normally or the excess flow valve 40 is in the opened state.

If it is determined that the excess flow valve 40 is in the closed state based on the comparison result in S110, the control unit 50 suspends the hydrogen consumption by limiting the output of the fuel cell 30 to prevent the vehicle from being turned off (S120).

At the present time, the control unit 50 suspends the operation of the fuel cell 30 until the excess flow valve 40 recovers to the opened state. If the excess flow valve 40 is in the closed state, hydrogen is supplied to the hydrogen supply line 20 through the pin hole 45 of the excess flow valve 40, and the internal pressure of the hydrogen supply line 20 becomes the same as the internal pressure of the hydrogen tank 10 such that the excess flow valve 40 returns to the opened state.

Furthermore, the control unit 50 may limit the output of the fuel cell 30 and operate the vehicle in an electric vehicle (EV) mode until the excess flow valve 40 recovers to the opened state (S130). If the vehicle is operated in the electric vehicle mode in which only a battery is used, the vehicle may travel in a state of suspending the hydrogen consumption of the fuel cell 30.

A consumption time (Z) required for recovering the excess flow valve 40 to the opened state may be determined according to the temperature and pressure of the hydrogen tank 10, properties of the excess flow valve 40, a length of the hydrogen supply line 20, and the number of hydrogen tanks 10 mounted on the vehicle.

The control unit 50 restarts the fuel cell 30 when the excess flow valve 40 recovers to the opened state (S140). That is, the control unit 50 restarts the fuel cell 30 when the consumption time (Z) elapses after limiting the output of the fuel cell 30.

When the excess flow valve 40 recovers to the opened state, hydrogen may be normally supplied to the hydrogen supply line 20 such that the fuel cell 30 may be operated in a high-output mode with a large amount of hydrogen consumed.

Here, the control unit 50 may include one or more control units provided in the vehicle. For example, the control unit 50 may include a vehicle control unit (VCU), a fuel cell control unit (FCU), and the like.

For example, in S110, the vehicle control unit (VCU) may request the fuel cell control unit (FCU) to limit the output of the fuel cell 30 when it is determined that the excess flow valve 40 is in the closed state.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A valve recovery control apparatus for a hydrogen tank, the apparatus comprising:

an excess flow valve mounted on an outlet of a hydrogen tank;

a hydrogen supply line connected to the excess flow valve, and configured to supply hydrogen stored in the hydrogen tank to a fuel cell connected to the hydrogen supply line; and a control unit configured to determine whether the excess flow valve is closed based on an amount of hydrogen consumed in the fuel cell and a pressure reduction rate in the hydrogen supply line when a pressure of the hydrogen tank is greater than a pressure of the hydrogen supply line, and to suspend an operation of the fuel cell until the excess flow valve recovers to an opened state when the controller concludes that the excess flow valve is in a closed state and then to restart the fuel cell when the excess flow valve recovers to the opened state from the closed state, wherein the control unit is configured to operate a vehicle in an electric vehicle mode until the excess flow valve recovers to the opened state when the excess flow valve is in the closed state.

2. The valve recovery control apparatus of claim 1, wherein the control unit concludes that the excess flow valve is in the closed state, when the amount of hydrogen consumed per unit time in the fuel cell is a predetermined minimum amount of consumption or greater than the predetermined minimum amount and the pressure reduction rate of the hydrogen supply line is greater than a predetermined first pressure reduction rate.

3. The valve recovery control apparatus of claim 1, wherein the control unit concludes that the excess flow valve is in the opened state, when the amount of hydrogen consumed per unit time in the fuel cell is a predetermined minimum amount of consumption or greater than the predetermined minimum amount and the pressure reduction rate in the hydrogen supply line is a predetermined first pressure reduction rate or less than the predetermined first pressure reduction rate.

4. The valve recovery control apparatus of claim 2, wherein the predetermined minimum amount of consumption is set as a value of a minimum amount of hydrogen consumed in the fuel cell causing a reduction in the pressure of the hydrogen supply line when the excess flow valve is in the closed state.

5. The valve recovery control apparatus of claim 2, wherein the first pressure reduction rate is set as a value of a maximum pressure reduction rate of the hydrogen supply line generatable when the excess flow valve is in the opened state.

6. The valve recovery control apparatus of claim 1, wherein the excess flow valve includes:

a housing provided with a valve inlet and a valve outlet;

a poppet slidably assembled in the housing;

a spring mounted in the housing to elastically support the poppet toward the valve inlet; and a pin hole configured to supply the hydrogen of the hydrogen tank to the hydrogen supply line when the poppet closes the valve outlet while compressing the spring.

7. A method of controlling a valve recovery control apparatus for a hydrogen tank in which the valve recovery control apparatus includes an excess flow valve mounted on an outlet of the hydrogen tank and a hydrogen supply line connected to the excess flow valve, and configured to supply hydrogen stored in the hydrogen tank to a fuel cell connected to the hydrogen supply line, the method comprising:

determining, by a controller, whether the excess flow valve is closed based on an amount of hydrogen consumed in the fuel cell and a pressure reduction rate in the hydrogen supply line when a pressure of the hydrogen tank is greater than a pressure of the hydrogen supply line; and suspending, by the controller, an operation of the fuel cell until the excess flow valve recovers to an opened state when the controller concludes that the excess flow valve is in a closed state and then restarting the fuel cell when the excess flow valve recovers to the opened state from the closed state, wherein the controller is configured to operate a vehicle in an electric vehicle mode until the excess flow valve recovers to the opened state when the excess flow valve is in the closed state.

8. The method of claim 7, wherein the control unit concludes that the excess flow valve is in the closed state, when the amount of hydrogen consumed per unit time in the fuel cell is a predetermined minimum amount of consumption or greater than the predetermined minimum amount and the pressure reduction rate of the hydrogen supply line is greater than a predetermined first pressure reduction rate.

9. The method of claim 7, wherein the control unit concludes that the excess flow valve is in the opened state, when the amount of hydrogen consumed per unit time in the fuel cell is a predetermined minimum amount of consumption or greater than the predetermined minimum amount and the pressure reduction rate in the hydrogen supply line is a predetermined first pressure reduction rate or less than the predetermined first pressure reduction rate.

10. The method of claim 8, wherein the predetermined minimum amount of consumption is set as a value of a minimum amount of hydrogen consumed in the fuel cell causing a reduction in the pressure of the hydrogen supply line when the excess flow valve is in the closed state.

11. The method of claim 8, wherein the first pressure reduction rate is set as a value of a maximum pressure reduction rate of the hydrogen supply line generatable when the excess flow valve is in the opened state.

12. A non-transitory computer readable storage medium on which a program for performing the method of claim 7 is recorded.

* * * * *